United States Patent
Genise

(10) Patent No.: US 6,859,710 B2
(45) Date of Patent: Feb. 22, 2005

(54) AUTOMATED CENTRIFUGAL CLUTCH SYSTEM WITH OPEN-LOOP THROTTLE CONTROL

(75) Inventor: Thomas Alan Genise, Dearborn, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/303,454

(22) Filed: Nov. 25, 2002

(65) Prior Publication Data

US 2004/0102885 A1 May 27, 2004

(51) Int. Cl.[7] ............................................. G06F 7/00
(52) U.S. Cl. .................................................. 701/67
(58) Field of Search ............................ 701/67, 51, 52, 701/55, 56

(56) References Cited

U.S. PATENT DOCUMENTS

| | | | |
|---|---|---|---|
| 3,580,372 A | 5/1971 | Schiefer et al. | |
| 3,696,901 A | 10/1972 | Henry | |
| 3,810,533 A | 5/1974 | Densow | |
| 4,361,060 A | 11/1982 | Smyth | |
| 4,610,343 A | 9/1986 | Hikari | |
| 4,648,290 A | 3/1987 | Dunkley et al. | |
| 4,819,779 A | 4/1989 | Nickel et al. | |
| 4,850,236 A | 7/1989 | Braun | |
| 5,409,432 A | 4/1995 | Steeby | |
| 5,437,356 A | 8/1995 | Lohr | |
| 5,441,137 A | 8/1995 | Organek et al. | |
| 5,582,558 A | 12/1996 | Palmeri et al. | |
| 5,730,269 A | 3/1998 | Hersey | |
| 5,735,771 A | 4/1998 | Genise | |
| 6,015,366 A | 1/2000 | Markyvech et al. | |
| 6,308,124 B1 * | 10/2001 | Kresse et al. | ........... 701/53 |
| 6,481,516 B1 * | 11/2002 | Field et al. | ........... 180/65.2 |

* cited by examiner

Primary Examiner—Yonel Beaulieu
(74) Attorney, Agent, or Firm—Rader, Fishman & Grauer PLLC

(57) ABSTRACT

A control system and method of operating a vehicle prime mover to control a centrifugal clutch is provided. The control system includes a control unit for receiving signals (THL) corresponding to a throttle operating parameter value. The control unit is configured to map the throttle operating parameter value to a predetermined throttle operating parameter value and sets an operating mode of the prime mover based on the predetermined throttle operating parameter value. The invention provides, among other things, a smooth, controllable engagement of the centrifugal clutch.

18 Claims, 2 Drawing Sheets

AUTOMATED CENTRIFUGAL CLUTCH SYSTEM WITH OPEN-LOOP THROTTLE CONTROL

FIELD OF THE INVENTION

The present invention relates generally to a vehicular transmission system utilizing a centrifugal master friction clutch. In particular, the present invention relates to an automated vehicular transmission system comprising a prime mover, a multiple ratio transmission, a centrifugally operated master friction clutch for drivingly coupling the engine to a transmission, and a control unit for controlling operation of the prime mover to engage the centrifugal master friction clutch.

BACKGROUND OF THE INVENTION

Vehicle driveline systems employing centrifugally operated friction clutches are well known in the art. A centrifugal clutch typically includes an input member driven by a primer mover, usually an electric motor or internal combustion engine, and weights pivotable or rotatable with respect to the driving member which, upon rotation of the input member, will move radially outwardly under the effect of centrifugal force to cause the input member to frictionally engage an output member. Examples of centrifugally operated clutches may be seen by reference to U.S. Pat. Nos. 3,580,372; 3,580,372; 3,696,901; 5,437,356; 3,810,533; 4,819,779; 5,441,137; 5,730,269 and 4,610,343, the disclosures of which are incorporated herein by reference.

One characteristic of a centrifugal clutch is that the vehicle employing the clutch can be launched without any secondary control other than the primary driver input via the vehicle throttle. However, in vehicles that include a compliant driveline, such as a heavy truck, the driver is required to carefully apply the throttle during launch to avoid over-applying prime mover torque that would induce undesirable torsional oscillations in the driveline. Accordingly, the need exists for a control system that, among other things, provides a smooth, controllable engagement of a centrifugal clutch, regardless of throttle input.

SUMMARY OF THE INVENTION

In accordance with the embodiments of the present invention, a control system and method of operating a vehicle prime mover, such as an engine, to control a centrifugal clutch is provided. The control system includes a control unit for receiving signals corresponding to a throttle operating parameter value. The control unit is configured to map the throttle operating parameter value to a predetermined throttle operating parameter value and sets an operating mode of the prime mover based on the predetermined throttle operating parameter value. When the predetermined throttle operating parameter is throttle position, the control system maps a driver's application of the throttle into a predetermined, alternate application of the throttle before applying the predetermined throttle position to operate the prime mover. The control system and method of operating a vehicle prime mover according to the principles of the present invention provide, among other things, a smooth, controllable engagement of a centrifugal clutch regardless of throttle input.

Various additional aspects of this invention will become apparent to those skilled in the art from the following detailed description of the preferred embodiment, when read in light of the accompanying drawings.

DESCRIPTION OF THE PREFERRED EMBODIMENTS

Figure 1:
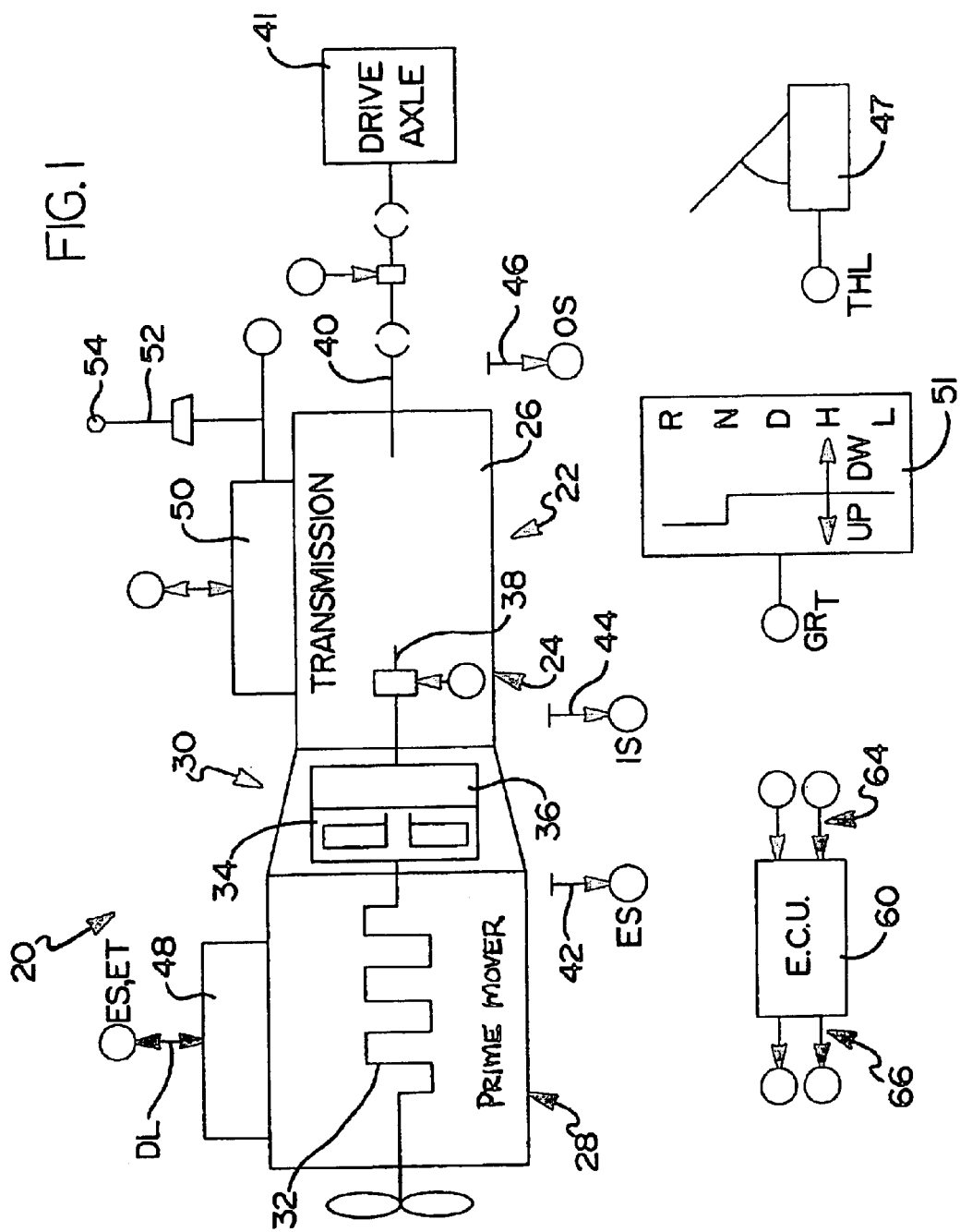
FIG. 1 is a schematic illustration of an exemplary vehicular drive-train system utilizing a centrifugal clutch and the control system and method of the present invention.

Referring now to the drawings, the preferred embodiments of the present invention are described in detail. An exemplary schematic illustration of an at least partially automated vehicle drive-train system 20 utilizing a centrifugally operated master friction clutch is shown in FIG. 1. System 20 may be fully automated, as seen by way of example in U.S. Pat. No. 4,361,060, partially automated, as seen by way of example in U.S. Pat. Nos. 4,648,290 and 5,409,432, or manual with controller assist, as seen by way of example in U.S. Pat. Nos. 4,850,236; 5,582,558; 5,735, 771 and 6,015,366.

In system 20, a multi-gear transmission 22 having a main transmission section 24, which may or may not be connected in series with a splitter-type auxiliary transmission section 26, is drivingly connected to a prime mover by a centrifugal master friction clutch 30. While the prime mover may take many forms, including, but not limited to, a heat engine, electric motor or hybrid thereof, the prime mover discussed herein is an internal combustion engine 28.

Engine 28 includes a crankshaft 32, which is attached to an input member 34 of centrifugal master friction clutch 30. Input member 34 frictionally engages with, and disengages from, an output member 36, which is attached to an input shaft 38 of transmission 22. The clamping force (CF) and torque transfer capacity of clutch 30 is a function of the rotational speed (ES) of engine 28 and clutch input member 34. Clutch 30 reaches incipient engagement at an engine speed (ES) greater than engine idle and fully engages at an engine speed lower than the engine speed at which a first upshift is required.

The terms "engaged" and "disengaged" as used in connection with a master friction clutch refer to the capacity, or lack of capacity, respectively, of the clutch to transfer a significant amount of torque. Mere random contact of the friction surfaces, in the absence of at least a minimal clamping force, is not considered engagement.

As illustrated in FIG. 1, centrifugal clutch 30 requires no external clutch actuator or connections to operating linkages, command signal inputs, power electronics and/or fluid power conduits. While the most economical application of the present invention is with a dry friction clutch, the present invention is also compatible with wet clutch technology.

Vehicle drive-train system 20 further includes at least one rotational speed sensor 42 for sensing engine rotational speed (ES), sensor 44 for sensing input shaft rotational speed (IS), and sensor 46 for sensing output shaft rotational speed (OS), and providing signals indicative thereof. The engaged and disengaged conditions of clutch 30 may be sensed by a position sensor or may be determined by comparing the speeds of the engine (ES) and the input shaft (IS). A sensor 47 is also provided for sensing a throttle pedal operating parameter, such as throttle position, and providing an output signal (THL) indicative thereof.

Engine 28 may be electronically controlled, including an electronic controller 48 communicating over an electronic data link (DL) operating under an industry standard protocol such as SAE J-1922, SAE J-1939, ISO 11898 or the like. An X-Y shift actuator 50 may be provided for automated or shift-by-wire shifting of the transmission main section and/or auxiliary section. A shift selector 51 allows the vehicle driver to select a mode of operation and provides a signal $GR_T$ indicative thereof. Alternatively, a manually operated shift lever 52 having a shift knob 54 thereon may be provided, which is manually manipulated in a known shift pattern for selective engagement and disengagement of various shift ratios. Shift knob 54 may include an intent-to-shift switch (not illustrated) by which the vehicle operator will request automatic engine fueling control to relieve torque lock and allow a shift to transmission neutral.

System 20 further includes a control unit 60, and more preferably an electronic control unit ("ECU"), such as a microprocessor based electronic control unit. ECU 60 receives input signals 64 from sensors 42, 44 and 46 and processes the signals according to predetermined logic rules to issue command output signals 66 to system actuators, such as engine controller 48, shift actuator 50, and the like.

One or more engine torque limit values may be commanded on, or read from, data link (DL). By way of example, datalinks complying with SAE J1939 or similar protocol, allow ECU 60 to issue commands over the datalink (DL) for the engine to be fueled in any one of several modes, such as (i) in accordance with the operator's application of the throttle, (ii) to achieve a commanded or target engine speed ($ES=ES_T$), (iii) to achieve a commanded or target engine torque ($ET=ET_T$) and (iv) to maintain engine speed and engine torque below limits ($ES<ES_{MAX}$ and $ET<ET_{MAX}$). Many input/informational signals, such as engine speed (ES), engine torque (ET), and the like may also be carried by datalink (DL). Engine torque as used herein refers to a value indicative of an engine torque, usually gross engine torque, from which an output or flywheel torque may be calculated or estimated.

To allow proper vehicle launch and dynamic shifting with the master clutch engaged, clutch 30 once fully engaged, should remain fully engaged at engine speeds greater than (i) the highest expected speed at which downshifts are initiated and (ii) the minimum expected engine speed after an upshift. Incipient engagement is the initial torque transfer contact of clutch friction surfaces. In the launch mode of operation, the transition from disengagement to engagement of the centrifugal master clutch 30 is dependent upon increasing engine speed (ES). A smooth transition between the disengaged and engaged states of clutch 30 is also dependent upon, among other things, the absence of torsional oscillations in the driveline.

ECU 60 is also electrically coupled to throttle sensor 47 to receive one or more output signals THL. Output signal THL corresponds to one or more throttle operating parameters, including, but not limited to, throttle position, throttle application rate, and acceleration of throttle application. For the sake of illustration, the following method of controlling engagement of clutch 30 will be described in response to receipt of an output signal THL corresponding to throttle position. It will be appreciated that the invention is not limited by ECU 60 receiving signals from throttle sensor 47, and that the invention can be practiced by ECU 60 receiving signals from any component that is capable of detecting the desired fueling rate of engine 28, such as engine controller 48.

Figure 2:
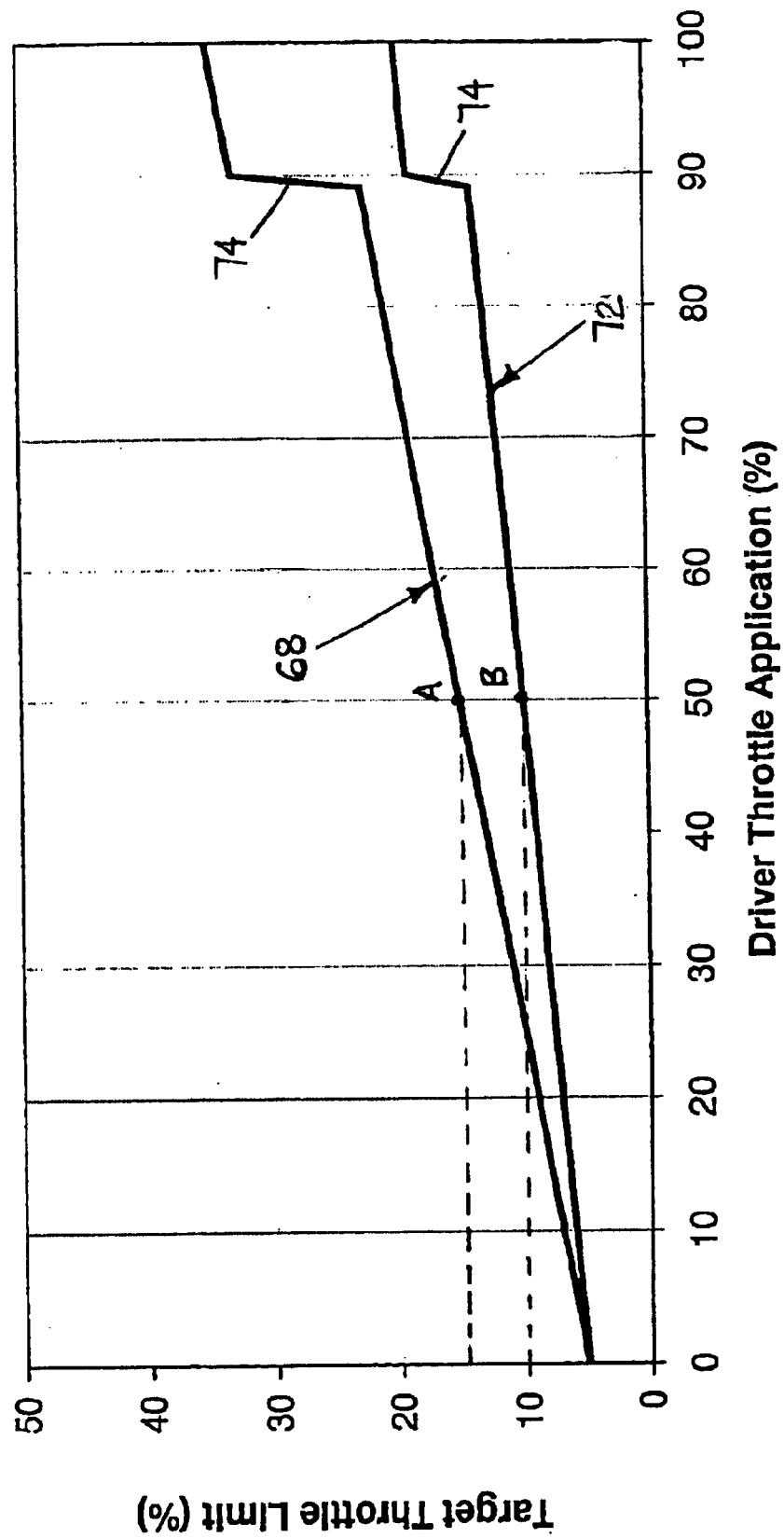
FIG. 2 is a schematic illustration, in graphical format, of exemplary characteristic maps for mapping driver throttle application to a predetermined target throttle application.

Referring to FIGS. 1 and 2, the control system and method of controlling drive-train system 20 according to an embodiment of the present invention will now be described. The control system and method of controlling drive-train system 20 are designed to facilitate a smooth transition between the disengaged and engaged states of clutch 30. The control system includes, among other things, engine controller 48 and ECU 60, which together function as a signaling device for commanding operation of engine 28. Engine controller 48 includes an output for selectively transmitting a command signal to engine 28 and engine 28 includes an input that selectively receives the command signal from engine controller 48. Engine controller 48 further includes at least one mode of operation for controlling engine fueling to control at least the engine speed (ES) the output torque of engine 28.

ECU 60 includes at least one input for receiving throttle output signals THL and processing the signals according to logic rules to issue command output signals 66 to engine controller 48. ECU 60 and/or engine controller 48 have programmed therein characteristic maps that correspond to preferred engine fueling routines that result in a predetermined engine speed and output torque for a given throttle input. The control system logic is open loop, meaning, when clutch 30 is disengaged and the engine speed (ES) and input shaft speed (IS) are not substantially equal, the driver's application of the throttle is "mapped" to a predetermined, alternate application of the throttle. It is the mapped throttle input that is used as a basis for controlling operation of engine 28.

FIG. 2 illustrates a pair of exemplary characteristic maps, which plot throttle application versus a predetermined target throttle limit, depicted as a percentage of full throttle. Referring to the upper map 68, when the throttle is applied to 50% of full throttle, Point A in FIG. 2, the control system maps the applied throttle application as a target throttle limit of approximately 15%. The control system uses the mapped target throttle limit of approximately 15% to fuel engine 28 as though the driver were applying the throttle to a position corresponding to approximately 15% of full throttle. Referring to the lower map 72, a similar driver throttle application of 50% of full throttle, Point B in FIG. 2, would result in a mapped target throttle limit of approximately 10%. The control system uses the mapped target throttle limit of approximately 10% to fuel engine 28 as though the driver were applying the throttle to a position corresponding to approximately 10% of full throttle. Accordingly, the characteristic maps programmed into a vehicle's control system may vary depending on several factors, including, but not limited to, the weight of the vehicle, rated prime mover output torque, and the transmission configuration.

The resulting throttle application is not applied immediately; rather it is preferably increased to the mapped target throttle limit at a controlled rate, such as, for example, 1% per 20 to 50 milliseconds. The controlled ramp-up of throttle application will result in a controlled increase in the engine speed (ES) and output torque that is slower than the natural frequency of the driveline to inhibit torsional oscillations in the driveline.

Optionally, each characteristic map may define a step rise or ride-through detent 74 in the region of throttle application substantially above a predetermined level, such as 90% of full throttle. This feature will provide increased torque near full throttle to improve launching performance of the vehicle.

It will be appreciated that the characteristic maps illustrated in FIG. 2, are presented for illustration only and are not intended to limit the scope of the invention. Accordingly, other characteristic maps, including those that are non-linear in shape, are also within the scope of the present invention. The control system can therefore be configured to accommodate various drive-train designs and vehicle configurations.

The control system and method of the present invention are particularly suited for engines that employ "min-max" type governor systems, which are well known in the art, wherein the prime mover output torque is proportional to the throttle input. Characteristic map 68 is an example of a map suitable for use with engines employing "min-max" type governor systems. However, the control system and method of the present invention will also function with drive-train systems that employ "all-speed" type governors, also known in the art, wherein the prime mover speed is regulated as a function of the throttle input. Characteristic map 72 is an example of a map suitable for use with engines employing "all-speed" type governor systems.

While the control system is defined above as including, among other things, engine controller 48 and ECU 60, it is not intended to be limited thereto. Engine controller 48 and ECU 60 may be incorporated into a single control unit for controlling operation of the vehicle components. Additionally, control system may include additional electronic components within drive-train system 20 or, alternatively, may be partially or fully mechanical, including, for example, mechanical limits and dashpots to limit or otherwise control a driver's application of the throttle.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A method of operating a vehicle prime mover to control a centrifugal clutch, comprising the steps of:
    determining a throttle operating parameter value;
    mapping the throttle operating parameter value to a predetermined throttle operating parameter value; and
    setting an operating mode of the prime mover based on the predetermined operating parameter value.

2. The method of claim 1, further including the step of determining when the clutch is disengaged prior to determining the throttle operating parameter value.

3. The method of claim 1, wherein the mapping step is further defined by mapping the throttle operating parameter value to a lower predetermined throttle operating parameter value.

4. The method of claim 3, wherein the setting step is further defined by setting the prime mover speed based on the lower predetermined throttle operating parameter value.

5. The method of claim 1, wherein the throttle operating parameter value and predetermined throttle operating value correspond to throttle position.

6. The method of claim 1, wherein the setting step is further defined by operating the prime mover based on a ramping rate of throttle application.

7. The method of claim 6, wherein the setting step is further defined by ramping the throttle application from no throttle application to the lower predetermined throttle position.

8. A control system for operating a vehicle prime mover to control a centrifugal clutch, the control system comprising:
    a control unit for receiving signals (THL) corresponding to a throttle operating parameter value, the control unit configured to map the throttle operating parameter value to a predetermined throttle operating parameter value and sets an operating mode of the prime mover based on the predetermined throttle operating parameter value.

9. The control system of claim 8, wherein the control unit is configured to determine if the clutch is disengaged prior to or contemporaneous with receipt of signals (THL).

10. The control system of claim 8, wherein the predetermined throttle operating parameter value is lower than the throttle operating parameter value.

11. The control system of claim 10, wherein the throttle operating parameter and the predetermined throttle operating value correspond to throttle position.

12. The control system of claim 11, wherein the operating mode of the prime mover is further defined by operating the prime mover based on a ramping rate of throttle application.

13. The control system of claim 12, wherein the operating mode of the prime mover is further defined by ramping the throttle application from no throttle application to the lower predetermined throttle position.

14. The control system of claim 8, wherein the control unit includes logic rules for:
    determining a throttle operating parameter value;
    mapping the throttle operating parameter value to a predetermined throttle operating parameter value; and
    setting an operating mode of the engine based on the predetermined operating parameter value.

15. The control system of claim 14, wherein the logic rules further include the step of determining when the clutch is disengaged prior to determining the throttle operating parameter value.

16. The control system of claim 8, further including at least one sensor for sensing at least one throttle operating parameter and providing an output signal (THL) to said controller indicative thereof.

17. A method of operating a vehicle prime mover to control a centrifugal clutch, comprising the steps of:
    determining a desired application of a vehicle throttle;
    limiting the application of the throttle to a predetermined target throttle application; and
    operating the prime mover based on the target throttle application.

18. A control system for operating a vehicle prime mover to control a centrifugal clutch, the control system comprising:
    a control unit for determining a desired application of a vehicle throttle, the control unit configured to limit the desired application of the vehicle throttle to a predetermined target throttle application and operate the prime mover based on the target throttle application.

* * * * *